United States Patent [19]

Willis

[11] Patent Number: 4,851,476

[45] Date of Patent: Jul. 25, 1989

[54] FUNCTIONALIZED POLYMERS AND PROCESS FOR MODIFYING UNSATURATED POLYMERS

[75] Inventor: Carl L. Willis, Houston, Tex.

[73] Assignee: Shell Oil Company, Houston, Tex.

[21] Appl. No.: 77,827

[22] Filed: Jul. 27, 1987

[51] Int. Cl.[4] .................................................. C08F 8/04
[52] U.S. Cl. .................................... 525/105; 525/106; 525/123; 525/153; 525/154; 525/245; 525/331.7; 525/332.8; 525/332.9; 525/333.1; 525/333.2; 525/339
[58] Field of Search ............... 525/105, 106, 123, 153, 525/154, 245, 339

[56] References Cited

U.S. PATENT DOCUMENTS

| | | | |
|---|---|---|---|
| Re. 27,145 | 6/1971 | Jones | 260/880 |
| 3,135,716 | 6/1964 | Uraneck et al. | 260/45.5 |
| 3,150,209 | 9/1964 | Short et al. | 260/894 |
| 3,231,635 | 1/1966 | Holden et al. | 260/880 |
| 3,265,765 | 8/1966 | Holden et al. | 260/876 |
| 3,322,856 | 5/1967 | Holden et al. | 260/876 |
| 3,419,365 | 12/1968 | Streets | 44/62 |
| 3,496,154 | 2/1970 | Wofford | 260/84.7 |
| 3,498,960 | 3/1970 | Wofford | 260/84.7 |
| 3,541,064 | 11/1970 | Yoshimoto et al. | 260/85.1 |
| 3,595,942 | 7/1971 | Wald et al. | 260/880 |
| 3,644,588 | 2/1972 | Hassell | 260/879 |
| 4,028,485 | 6/1977 | Poloso et al. | 528/486 |
| 4,145,298 | 3/1979 | Trepka | 252/51.5 |
| 4,238,202 | 12/1980 | Trepka et al. | 44/62 |
| 4,391,949 | 7/1983 | St. Clair | 525/99 |
| 4,400,478 | 8/1983 | Gergen et al. | 523/514 |
| 4,409,357 | 10/1983 | Milkovich | 524/505 |
| 4,444,953 | 4/1984 | St. Clair | 525/98 |
| 4,578,429 | 3/1986 | Gergen et al. | 525/291 |

*Primary Examiner*—Joseph L. Schofer
*Assistant Examiner*—Bernard Lipman

[57] ABSTRACT

Unsaturated hydrocarbon polymers are hydrogenated in the presence of a catalyst obtained by combining a Group VIII-A metal alkoxide or carboxylate and an alkyl or hydride of a metal selected from Groups I-A, II-A and III-B and then functionalized by contacting the hydrogenated polymer with a functionalizing agent before the hydrogenation catalyst is quenched or otherwise deactivated. The hydrogenation is, generally, accomplished at relatively mild conditions to avoid degradation of the polymer and, in the case of unsaturated copolymers comprising aromatic unsaturation, to avoid any significant hydrogenation of the aromatic unsaturation. Generally, the hydrogen partial pressure employed will be below about 1000 psig and the hydrogenation temperature will be below about 125° C. The hydrogenated polymer may be functionalized by reaction with functionalizing agent select from the group carbon dioxide, ethylene oxide, aldehydes, ketones, carboxylic acid salts and esters, halides, epoxides, sulfur, boron alkoxides, isocyanates, various silicon compounds and the like. Carbon dioxide is a particularly preferred functionalizing agent since the thus functionalized polymer is useful as a modifier in sheet and bulk molding compositions and readily responds to the presence of thickening agents.

21 Claims, No Drawings

FUNCTIONALIZED POLYMERS AND PROCESS FOR MODIFYING UNSATURATED POLYMERS

BACKGROUND OF THE INVENTION

This invention relates to functionalized polymers and to a method of preparing such polymers. More particularly, this invention relates to hydrogenated polymers containing functional groups and to a method for preparing such polymers.

Polymers containing ethylenic unsaturation are, of course, well known in the prior art. When these polymers are prepared by the addition polymerization of a polyunsaturated olefin, the unsaturation may be contained within the polymer backbone or pendent therefrom dependent upon the addition mechanism. For example, when 1,3-butadiene is the monomer, the unsaturation will be internal when the addition is 1,4 and external when the addition is 1,2. As is also known in the prior art, both of these unsaturations are relatively unstable and are subject to both thermal and oxidative degradation. In a diolefin homopolymer or a random copolymer, degradation of an internal double bond simply reduces the average molecular weight of the product. When such degradation occurs in a block copolymer, however, degradation of an internal double bond may be far more serious even to the extent of destroying desired polymeric properties. Degradation of an external unsaturation, on the other hand, in all such polymers simply reduces the polymers elastomeric properties. It is, of course, well known in the prior art to hydrogenate addition polymers containing both internal and pendent unsaturation to avoid such degradation. Hydrogenation of such polymers is taught, for example, in U.S. Pat. Nos. 3,419,365; 3,644,588; 4,400,478; 4,578,429 and Re. 27,145.

The incorporation of one or more functional groups into a polymer containing unsaturation to improve its properties for various uses is also well known in the prior art. Methods for incorporating functional groups into such polymers are taught, for example, in U.S. Pat. Nos. 3,135,716; 3,150,209 and 4,409,357. When the ethylenic unsaturation in the initial polymer is completely saturated via hydrogenation however, it has not, heretofore, been possible to incorporate functional groups into the polymer via these techniques. Moreover, when the starting polymer is a copolymer of a vinyl aromatic hydrocarbon and a polyolefin, and the residual unsaturation initially in the polyolefin portion of the copolymer has been substantially completely saturated via hydrogenation, the functional groups will be incorporated exclusively into the aromatic portion of the copolymer. Functional groups incorporated into the aromatic portion of the copolymer may not, however, be as reactive as those incorporated into the polyolefin portion of the copolymer. Moreover, functional groups incorporated into the aromatic portion of a copolymer may not, in all cases, result in the same end-use properties.

While it is, at least, theoretically possible to first incorporate one or more functional groups into a polymer and then to hydrogenate the functionalized polymer, attempts to do this have not been successful to date primarily due to poisoning of the hydrogenation catalyst by the functional group. Attempts to accomplish such hydrogenation have also been hampered by the potential for reductive hydrogenation and by conversion of the functional group during hydrogenation.

As indicated supra, it is also, theoretically, possible to first hydrogenate the polymer product and to then metalate the hydrogenated product to facilitate functionalization of the hydrogenated polymer. Metalization of a hydrogenated copolymer of a conjugated diene and a monovinylarene is taught in U.S. Patent No. 4,145,298. According to the disclosure of this patent, however, the metalated sites are then used to graft organic nitrogen compounds so as to produce a viscosity index improver. To the extent that the residual unsaturation in the diolefin portion of the polymer is substantially completely hydrogenated, however, the metal sites will be incorporated principally, if not exclusively, in the aromatic portion of the polymer. Such metalization, i.e., in the aromatic portion of the polymer generally requires the use of more metalating agent than does metalization of residual unsaturation in the diolefin portion of the polymer and, generally, requires the use of one or more metalization promoters such as an amine. Moreover, hydrogenation followed by metalization increases the number of steps required to accomplish the end result.

In light of the foregoing, it is clear that it has, heretofore, not been possible to produce a functionalized hydrogenated copolymer of a monoalkenyl aromatic hydrocarbon and a polyolefin wherein the functional groups are predominantly in the polyolefin portion of the polymer, at least not when the functional groups are two or more carbon atoms removed from any residual unsaturation. Moreover, it has not, heretofore, been possible to produce a functionalized, hydrogenated polymer without accomplishing each in a distinctly separate step. The need, then, for a functionalized, hydrogenated copolymer of a monoalkenyl aromatic hydrocarbon and a polyolefin wherein the functional groups are at least predominantly in the polyolefin portion of the copolymer and the need for a process wherein such a copolymer may be prepared with a reduced number of steps is believed to be readily apparent.

SUMMARY OF THE INVENTION

It is now been discovered that the foregoing and other disadvantages of the prior art functionalized thermoplastic elastomeric polymers can be overcome or at least significantly reduced with the functionalized thermoplastic elastomeric polymer of the present invention which is prepared by the process of this invention. It is, therefore, an object of the present invention to provide an improved functionalized thermoplastic elastomeric polymer and a process for making said improved functionalized thermoplastic elastomeric polymer. It is another object of this invention to provide such a functionalized thermoplastic elastomeric polymer which will exhibit the improved properties of a hydrogenated, functionalized thermoplastic elastomeric polymer. It is still another object of this invention to provide a process for preparing such an improved functionalized thermoplastic elastomeric polymer which requires a reduced number of steps. It is still a further object of this invention to provide an improved functionalized hydrogenated thermoplastic polymer wherein the functional groups are predominantly, if not exclusively, in the elastomer portion of said polymer. The foregoing and other objects and advantages will become apparent from the description set forth hereinafter.

In accordance with the present invention, the foregoing and other objects and advantages are accomplished by first hydrogenating a polymer comprising polyolefin monomeric units in the presence of a hydrogenation catalyst obtained by combining an alkoxide or carboxylate of a metal of Group VIII of Mendeleev's Periodic Table of Elements and at least one of certain metal hydrides or alkyls and thereafter contacting the hydrogenated polymer with a functionalizing agent before the hydrogenation catalyst is deactivated. As indicated more fully hereinafter, it is important that the contacting between the hydrogenated polymer and the functionalizing agent be accomplished before the hydrogenation catalyst is quenched or otherwise deactivated. Following the contacting with the functionalizing agent, the hydrogenation catalyst may be deactivated and the polymer product recovered as a crumb.

DETAILED DESCRIPTION OF THE INVENTION

As indicated supra, the present invention relates to a homopolymer or copolymer comprising a polyolefin which has been hydrogenated and functionalized and to a process for hydrogenating and functionalizing such a polymer. As also indicated, supra, the hydrogenation and functionalization are, in effect, accomplished in a single step by first contacting the polymer with hydrogen in the presence of a hydrogenation catalyst obtained by combining an alkoxide or carboxylate of a Group VIII metal of the Mendeleev Periodic Table of the Elements and a metal hydride or alkyl and then with a functionalizing agent. As also indicated supra, the hydrogenated polymer will be contacted with said functionalizing agent before the hydrogenation catalyst is quenched or otherwise deactivated.

In general, any polymer containing unsaturation, such as that imparted through the polymerization of a polyolefin, may be hydrogenated and functionalized by the method of the present invention. Such polymers include homopolymers of polyolefins, particularly conjugated diolefins and copolymers of one or more polyolefins, particularly conjugated diolefins, and one or more other vinyl monomers which homopolymers and copolymers may be prepared via anionic polymerization with an organo alkali metal catalyst or initiator. Such polymers also include polyolefin homopolymers and copolymers prepared via polymerization in the presence of a free radical initiator and polyolefin homopolymers and copolymers prepared via cationic initiation.

In general, the polyolefin homopolymers and copolymers which are hydrogenated and functionalized in the method of the present invention will have a weight average molecular weight within the range from about 2,000 to about 450,000. The copolymers which may be hydrogenated and functionalized may be random, block or tapered. In general, and when the copolymer contains one or more vinyl monomers different from the polyolefin, the polyolefin will comprise from about 1 to about 99 wt % of the polymer.

As indicated supra, unsaturated polymers which may be hydrogenated and functionalized by the method of the present invention are elastomers comprising monomeric units of at least one polyolefin, particularly a conjugated diolefin. In general, the unsaturated polymer may contain monomeric units of at least one polyolefin, particularly a conjugated diolefin, containing from 4 to about 12 carbon atoms such as 1,3-butadiene, isoprene, piperylene, methylpentyldiene, phenylbutadiene, 3,4-dimethyl-1,3-hexadiene, 4,5-diethyl-1,3-octadiene and the like. Preferably, the unsaturated polymer will comprise monomeric units of at least one conjugated diene containing 4 to 8 carbon atoms. As also indicated supra, the unsaturated polymeric elastomer which may be hydrogenated and functionalized by the method of this invention may be a copolymer of one or more of the aforementioned polyolefins and one or more other monomers. Other monomers which may be used include vinyl aryl compounds such as styrene, various alkyl styrenes such as $\alpha$-methyl styrene, paraalkoxystyrenes such as paramethoxystyrene, vinyl naphthalene, vinyl toluene and the like.

As indicated supra, the unsaturated polymers which may be hydrogenated and functionalized with the method of the present invention may be prepared via any of the techniques known in the prior art. These techniques include bulk, emulsion, suspension and solution polymerization. Moreover, any of the initiators known in the prior art may be used. Such initiators include free radicals and both anionic and cation polymerization catalyst. As is also well known in the prior art, elastomeric diolefin homopolymers and copolymers are most generally produced via either an emulsion technique using a free radical initiator or in solution using an anionic initiator. Emulsion polymerization is, generally, accomplished at a temperature within the range of from about 20° to about 90° C. and at a pressure within the range from about 1 to about 10 atm while solution polymerization with an anionic initiator is generally carried out at a temperature within the range from about $-100°$ C. to about 200° C. at a pressure within the range from about 1 to about 50 atm.

Unsaturated homopolymers and copolymers which may be hydrogenated and functionalized by the method of the present invention include those homopolymers and copolymers described in U.S. Pat. Nos. 3,135,716; 3,150,209; 3,496,154; 3,498,960; 4,145,298 and 4,238,202, the disclosure of which patents are herein incorporated by reference. Unsaturated polymers which may be hydrogenated and functionalized by the method of the present invention also include the block copolymers prepared in accordance with the method described in U.S. Pat. Nos. 3,231,635; 3,265,765; 3,322,856; 4,391,949 and 4,444,953; the disclosure of which patents are incorporated herein by reference. Particularly useful block copolymers are those block copolymers having one of the general formulae: $B_x$—(A—B)$_y$—$A_z$; $A_x$—(B—A)$_y$—$B_z$; $[B_{x'}$—(A—B)$_y$—$A_{z'}]_n$—Z and $[A_{x'}$—(B—A)$_y$—$B_{z'}]_n$—Z wherein A and B are as defined in the aforementioned U.S. Pat. Nos. 3,231,635; 3,265,765; 3,322,856; 4,391,949 and 4,444,953; x and z are, independently, integers equal to 0 or 1 and y is a whole number from 1 to about 25; x' and z' are, independently, integers ranging from 0 to the value of y; n is a whole number from 3 to 15, as determined by GPC on a polystyrene scale and Z is the poly (polyalkeyl coupling agent) nucleus of a star-shaped block copolymer.

In general, the unsaturated polymers to be hydrogenated and functionalized by the method of the present invention will be dissolved in a suitable solvent and then contacted with molecular hydrogen in the presence of a hydrogenation catalyst obtained by combining a Group VIII metal carboxylate or alkoxide and a hydride or an alkyl of a metal selected from Groups I-A, II-A and III-B of Mendeleev's Periodic Table of the Elements. Hydrogenation catalyst of this type are taught, for example, in U.S. Pat. Nos. 3,541,064; 3,595,942 and 4,028,485, the disclosure of which patents are herein incorporated by reference. Of the Group VIII metals, those of the so-called Iron Group; viz., iron, cobalt and nickel are particularly effective. Of the Group I-A, II-A and III-B metals, lithium, magnesium and aluminum are particularly effective. A key to selecting a metal of Groups I-A II-A and III-B for use in the hydrogenation catalyst is, of course, the stability of the metal alkyl formed by reaction of the initial hydride or alkyl with the polymer. In this regard, it has been found that the aluminum polymer alkyl is the least stable of those formed with the metals tested. It is, then, important that the subsequent contacting with a functionalizing agent be accomplished relatively quickly after hydrogenation when a catalyst comprising aluminum is used. The lithium polymer alkyl on the other hand is very stable. As a result, contacting with the functionalizing agent after hydrogenation may be delayed for relatively long periods.

In general, the hydrogenation will be accomplished in a suitable solvent at a temperature within the range from about 20° to about 50° C. at a hydrogen partial pressure below about 1000 psig and contacting between the polymer and the hydrogen will be maintained for a nominal holding time within the range from about 10 to about 1000 minutes. Suitable solvents for use during the hydrogenation include, but are not limited to, hydrocarbons such as paraffins, cycloparaffins, alkylsubstituted cycloparaffins, aromatics and alkyl-substituted aromatics containing from about 4 to about 10 carbon atoms per molecule. Suitable solvents include benzene, toluene, cyclohexane, methylcyclohexane, n-butane, n-hexane, n-heptane and the like.

While the inventor does not wish to be bound by any particular theory, it is believed that both the Group VIII metal and the metal selected from Groups I-A, II-A and III-B will react with the ethylenic unsaturation contained in the polymer to form polymeric alkyls during the hydrogenation. The Group VIII metal polymer alkyls are, however, relatively unstable and do not become involved in the subsequent functionalization reaction. The Group I-A, II-A and III-B metal polymer alkyls are, however, significantly more stable and the metal site, if not removed or otherwise rendered inactive during hydrogenation, will be available for subsequent reaction with the functionalizing agent. In any case, the functional group ultimately will be bonded to a carbon atom which initially was bonded to another carbon atom through a double bond. As a result, the functional group will be separated from any residual unsaturation by at least three carbon atoms. While still not wishing to be bound by any particular theory, it is also believed that the amount of functionalizing agent that may be incorporated is, in effect, proportional to the number of Group I-A, II-A and III-B metal atoms actually contained in the hydrogenation solution; or at least incorporated into the polymer during hydrogenation. The amount of functionalizing agent ultimately incorporated can, then, be controlled by controlling the amount of Group I-A, II-A and III-B metal added as a catalyst component and by controlling the extent of hydrogenation at least to the point that the ethylenic unsaturation is not completely hydrogenated. In any case, polyolefin portion of the polymer may be substantially completely saturated, if desired, partly due to hydrogenation and partly due to reaction with the functionalizing agent.

In general, the hydrogenation will be accomplished such that from about 10 to about 99% of the initial unsaturation in the polyolefin portion of the polymer becomes saturated during hydrogenation. At least a portion of the remaining unsaturation may, then, contain a metal atom which will be available for subsequent reaction with the selected functionalizing agent.

As indicated supra, the hydrogenated or partially hydrogenated polymer is next functionalized by contacting the same with a suitable functionalizing agent after the hydrogenation step has been completed or at least started and before the hydrogenation catalyst is quenched or otherwise deactivated. Functionalizing agents which will react with the partially hydrogenated polymer include, but are not necessarily limited to carbon dioxide, ethylene oxide, aldehydes, ketones, carboxylic acid salts, carboxylic acid esters, halides, epoxides, sulfur, boron alkoxides, isocyanates, various silicon compounds and the like. In general, contacting of the hydrogenated polymer and the functionalizing agent will be accomplished at a temperature within the range of from about 20° to about 150° C. and at a nominal holding time within the range from about 1 to about 200 minutes. Once the functional group or groups have been incorporated, the polymer may be recovered and then used in any of those applications for which the polymer is known to be useful. Alternatively, and where the functional group was incorporated for the purpose of enabling grafting or other reaction, the grafting or other reaction could be completed.

In general, from about 0.1 to about 5.0% of the initial unsaturation in the polyolefin portion of the polymer will become saturated as a result of reaction with a functionalizing agent, thereby incorporating from about 0.01 to about 5 wt % functional groups, based on final product. Moreover, the functionalization (hydrogenation) operating conditions actually contemplated for use in the process of this invention have been selected so as to insure that a predominant amount (more than 50%) of the functionalizing agent is incorporated into the polyolefin portion of the polymer. Further, these operating conditions can be even more restricted, as in the preferred embodiment, to insure that substantially all of the functionalizing agent is incorporated into the polyolefin portion of the polymer. As used herein, the recitation "substantially all" is intended to mean that at least 95% of the functionalizing agent is incorporated into the polyolefin portion of the polymer.

PREFERRED EMBODIMENT OF THE INVENTION

In a preferred embodiment of the present invention, an unsaturated block copolymer comprising at least one diolefin block and at least one vinyl arene block will be selectively hydrogenated and then contacted with carbon dioxide to incorporate functional groups. The block copolymer will be prepared using the method described in U.S. Pat. No. 3,231,635. In a most preferred embodiment of the present invention, the block copolymer will comprise three blocks and may be represented by the general formula A-B-A wherein A and B are, respectively, polymer blocks of an alkenyl-substituted aromatic hydrocarbon and a diolefin. In both the preferred and most preferred embodiments, the alkenyl-substituted aromatic hydrocarbon blocks will have a weight average molecular weight within the range from about 2,000 to about 50,000 and the diolefin blocks will have a number average molecular weight within the range from about 2,000 to about 150,000. In the most preferred embodiment of the present invention, the alkenylsubstituted aromatic hydrocarbon will be styrene and the diolefin will be a conjugated diolefin, particularly either butadiene or isoprene.

In both the preferred and most preferred embodiments, the block copolymer will be hydrogenated just after its production in solution with an anionic initiator, particularly a butyllithium compound. The hydrogenation will be completed in the presence of a hydrogenation catalyst prepared by combining nickel octoate and s-butyllithium. The molar ratio of nickel to lithium in the catalyst will be within the range from about 0.1:1 to about 0.6:1. The catalyst will be used at a concentration sufficient to provide from about 50 to about 500 ppm, by weight, of nickel in the polymer cement.

In the preferred and most preferred embodiments, the hydrogenation will be accomplished with a hydrogen partial pressure within the range from about 100 to about 800 psig and at a temperature within the range from about 40° to about 80° C. Contacting between the polymer and the hydrogen will be maintained for a period of time within the range from about 60 to about 240 minutes. In the preferred and most preferred embodiment from about 80 to about 98% of the initial unsaturation in the diolefin polymer will be saturated with hydrogen during hydrogenation.

After the hydrogenation reaction has been completed but before the reaction is quenched or the catalyst otherwise deactivated, and in a preferred embodiment, the polymer will be contacted with $CO_2$ at a $CO_2$ partial pressure within the range from about 10 to about 500 psig and at a temperature within the range from about 20° to about 80° C. Contacting of the polymer with $CO_2$ will be continued for a period of time within the range from about 1 to about 120 minutes. The contacting of the polymer and $CO_2$ will be accomplished in the presence of the same catalyst as was used during the hydrogenation. In both the preferred and most preferred embodiments from about 0.8 to about 2.0% of the initial unsaturation contained in the diolefin portion of the copolymer will be saturated as a result of reaction with the functionalizing agent.

After contacting of the polymer with carbon dioxide is completed, the hydrogenation and functionalization reactions may be quenched or the catalyst otherwise deactivated using techniques well known in the prior art. Reaction with an aqueous sulfuric acid solution is, however, particularly preferred following contacting with carbon dioxide since this will convert the metal salt group to the carboxyl group. Following quenching or deactivation of the hydrogenation catalyst, the polymer may be separated and recovered as a crumb and then used in any of the applications for which a carboxylated polymer would be useful. The polymers produced in the preferred and most preferred embodiment are particularly useful as a modifier in sheet molding and bulk molding compositions.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, 88 grams of a styrene-butadiene diblock copolymer were hydrogenated and then contacted with $CO_2$ in the presence of a catalyst consisting of the reaction product of nickel octoate and s-butyllithium, which had been combined in a Ni:Li molar ratio of 1:6. In the diblock polymer, the styrene blocks had a molecular weight of 37,000 and the butadiene blocks had a molecular weight of 63,000. The hydrogenation was started at a temperature of 40° C. and with a hydrogen partial pressure of 650 psig. The hydrogenation was completed in the presence of sufficient catalyst to provide 70 ppm. by weight of nickel based on block copolymer solution. The catalyst was added in 3 increments. After each increment was added, an exotherm was noted. After the first increment was added, the hydrogenation temperature rose to 52° C., after the second increment was added the hydrogenation temperature rose to 65° C. and after the third increment was added the hydrogenation temperature rose to 74° C. The hydrogenation was then continued for about 180 minutes then at a temperature of 80° C. After completion of the hydrogenation, 87.5 percent of the olefinic unsaturation had been hydrogenated. The extent of hydrogenation was determined using an ozone titration technique. The hydrogenated diblock was metalated. Without further treatment, the freshly hydrogenated, metalated block copolymer was functionalized by reaction with an excess of $CO_2$. Following the $CO_2$ contacting, 1% $H_2SO_4$ in water was added to the mixture to deactivate and separate the hydrogenation catalyst. Following this deactivation and separation, the polymer was recovered as a crumb using an excess of isopropyl alcohol.

To demonstrate that the recovered product was a carboxylate polymer, solution viscosity experiments were performed which showed that the polymer was ionomeric in nature. Specifically, a 6 wt % solution of the product polymer in cyclohexane was separated into 3 aliquots of 25 g each. The first, hereinafter solution 1, was a control and was not altered; the second was treated with 1 ml of acetic acid to minimize ionic association arising from polymer bound-$CO_2$- moieties; and the third was treated with 5 g $Mg(OH)_2$, to maximize the ionic association of the polymer —$CO_2$— sites. The three solutions were allowed to equilibrate for 2 days before the viscosity measurements were made using a Brookfield Viscometer. The measured viscosities of solutions 1, 2 and 3 were 68, 55 and 72 cp, respectively. As expected, the solution with the maximum ionic interaction, solution 3, was more than 30% more viscous than the solution wherein ionic interaction had been minimized, i.e., solution 2.

For purposes of comparison, the viscosity of 6 wt % solution of an identical hydrogenated diblock copolymer which had not been contacted with a functionalizing agent was 18 cp. Treatment of this solution with both acetic acid and $Mg(OH)_2$ gave solutions having viscosities of 16 cp after 2 days.

EXAMPLE 2

In this example, the procedure of Example 1 was repeated except that the hydrogenation temperature and holding time were reduced so as to produce a diblock copolymer having only 23% of the olefinic unsaturation hydrogenated. A 1200 g aliquot of the resulting polymer cement was then combined with 8.4 g of a functionalization promoter; viz., N,N,N',N'-tetramethylethylene-diamine and then contacted with $CO_2$ in the same manner as described in Example 1. An aliquot of the recovered carboxylated polymer was then dissolved in tetrahydrofuran and titrated with standardized methanolic KOH to a phenolphthalein endpoint. This titration revealed 0.02 wt % polymer bound carboxylic acid; i.e., pendent —$CO_2H$ groups.

An infrared (IR) spectrum of the carboxylated polymer had a signal at 1715 $cm^{-1}$ which is attributable to an aliphatic carboxylic acid moiety bound in the rubber (E/P) segment of the polymer. An IR of a sample of an identical hydrogenated diblock copolymer which was not contacted with $CO_2$ did not show a signal at 1715 $cm^{-1}$. Also, neither of the IR's showed a signal at 1690 $cm^{-1}$ which would be characteristic of a carboxylic acid moiety bound in the aromatic segment of the polymer. It can, then, be concluded that the method of this invention incorporates the functional groups into the polyolefin portion of the polymer and not into the aromatic portion thereof.

While the present invention has been described and illustrated by reference to particular embodiments thereof, it will be appreciated by those of ordinary skill in the art that the same lends itself to variations not necessarily illustrated herein. For this reason, then, reference should be made solely to the appendent claims for purposes of determining the true scope of the present invention.

Having thus described and illustrated the present invention what is claimed is:

1. A method for functionalizing an unsaturated polymer, comprising the steps of:
    (a) contacting said unsaturated polymer with hydrogen in the presence of a catalyst obtained by combining a Group VIII-A metal alkoxide or carboxylate and an alkyl or hydride of a metal selected from Group I-A, II-A or III-B of the Periodic Table of Elements;
    (b) after the hydrogenation of step (a) is completed and before the hydrogenation catalyst is quenched or metal sites produced on the polymer by the hydrogenation catalysts are otherwise deactivated, contacting the hydrogenated polymer with a functionalizing agent reactive with the metal sites on the hydrogenated polymer; and
    (c) recovering a functionalized, hydrogenated polymer.

2. The method of claim 1 wherein said hydrogenation is accomplished at a hydrogen partial pressure below about 1000 psig and at a temperature within the range from about 20° to about 150° C.

3. The method of claim 2 wherein said hydrogen partial pressure is within the range from about 100 to about 800 psig and said temperature is within the range from about 40° to about 80° C.

4. The method of claim 2 wherein the hydrogenated polymer from step (a) is contacted with a functionalizing agent at a temperature within the range from about 20° to about 150° C.

5. The method of claim 4 wherein said temperature is within the range from about 40° to about 80° C.

6. The method of claim 4 wherein said functionalizing agent is carboxylic acid salt.

7. The method of claim 4 wherein said functionalizing agent is a silicon compound.

8. The method of claim 4 wherein said functionalizing agent is $CO_2$.

9. The method of claim 8 wherein said catalyst comprises a Group VIII-A metal alkoxide.

10. The method of claim 9 wherein said Group VIII-A metal is an iron group metal.

11. The method of claim 10 wherein said metal from Groups I-A, II-A or III-B is selected from the group consisting of aluminum, magnesium and lithium.

12. The method of claim 11 wherein said Group VIII-A metal is nickel.

13. The method of claim 1 wherein the hydrogenation catalyst is deactivated after the contacting with the functionalizing agent is complete.

14. The method of claim 13 wherein said hydrogenation catalyst is deactivated by contacting with an acid.

15. The method of claim 14 wherein said acid is an aqueous solution of sulfuric acid.

16. The method of claim 11 wherein said metal from Groups I-A, II-A or III-B is lithium.

17. The method of claim 16 wherein said lithium is introduced as a lithium alkyl.

18. The method of claim 17 wherein said lithium alkyl is s-butyllithium.

19. The method of claim 8 wherein said Group VIII-A metal alkoxide or carboxylate is a carboxylate.

20. The method of claim 2 wherein said unsaturated polymer is a conjugated deolefin.

21. The method of claim 3 wherein said unsaturated polymer is a block copolymer comprising at least one diolefin block and at least one vinyl arene block.

* * * * *